Figure 1:
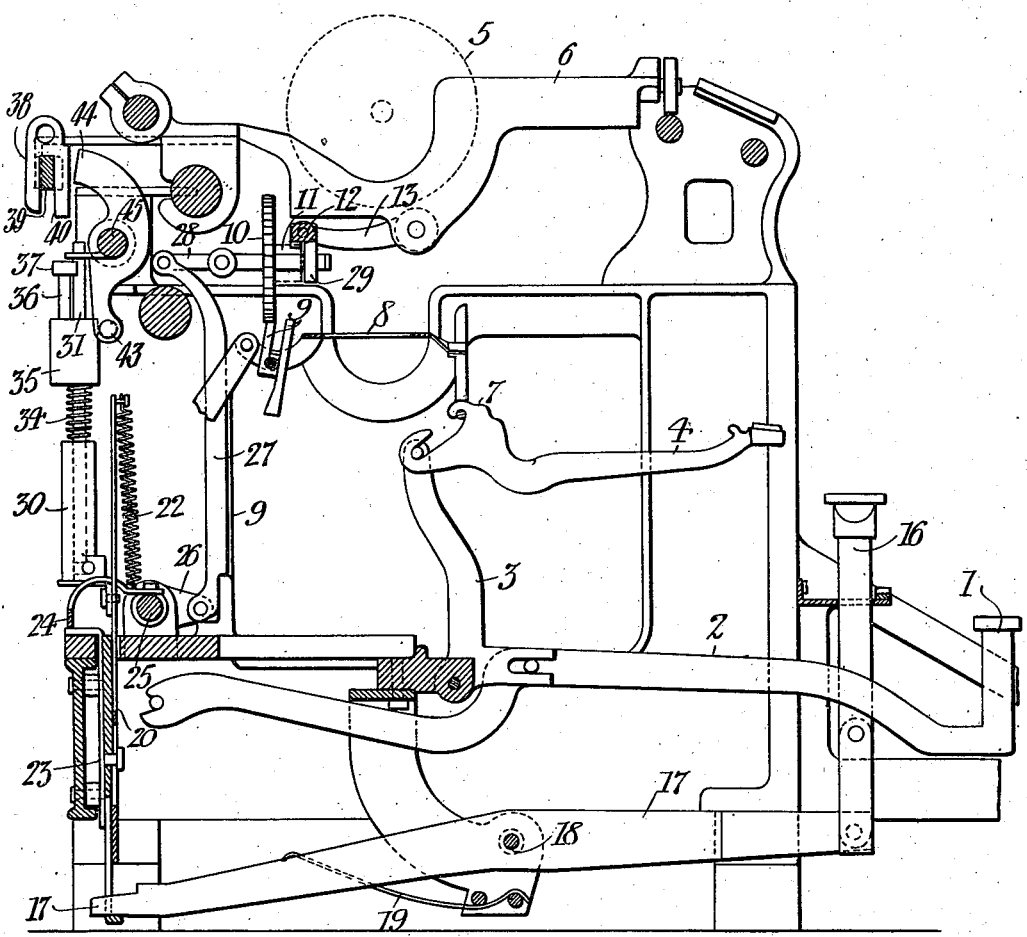

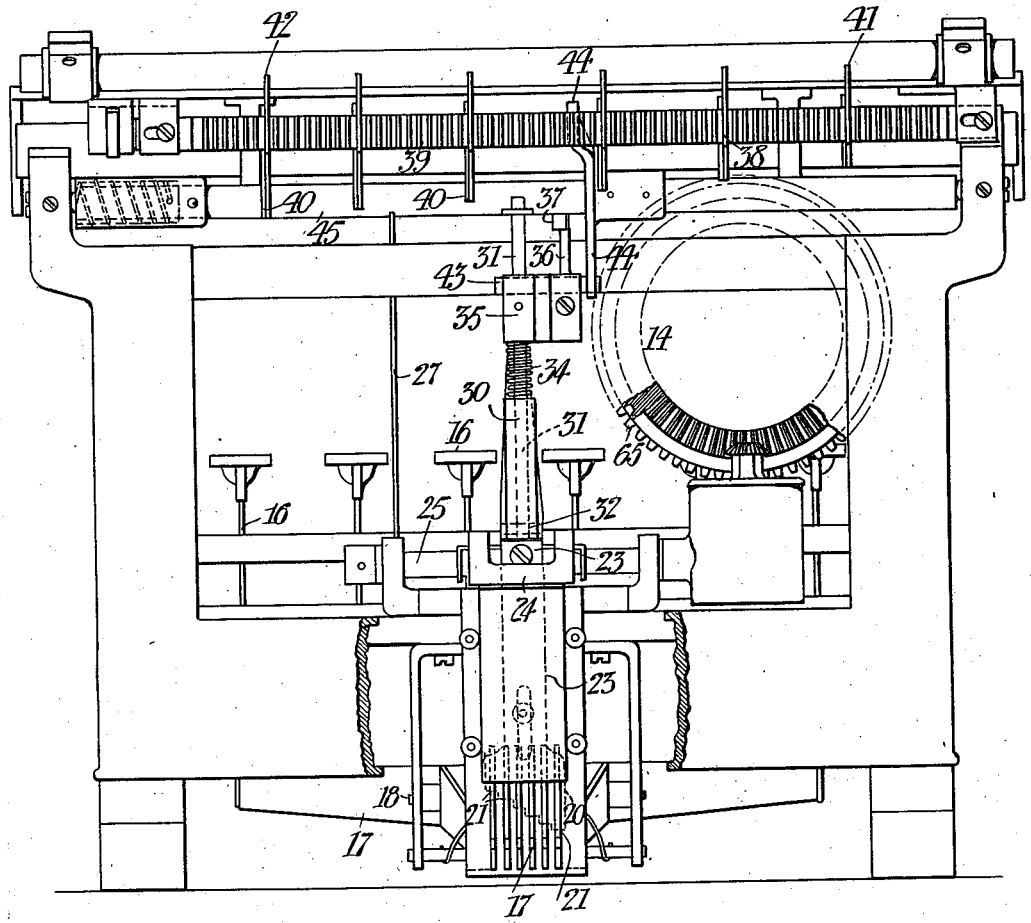

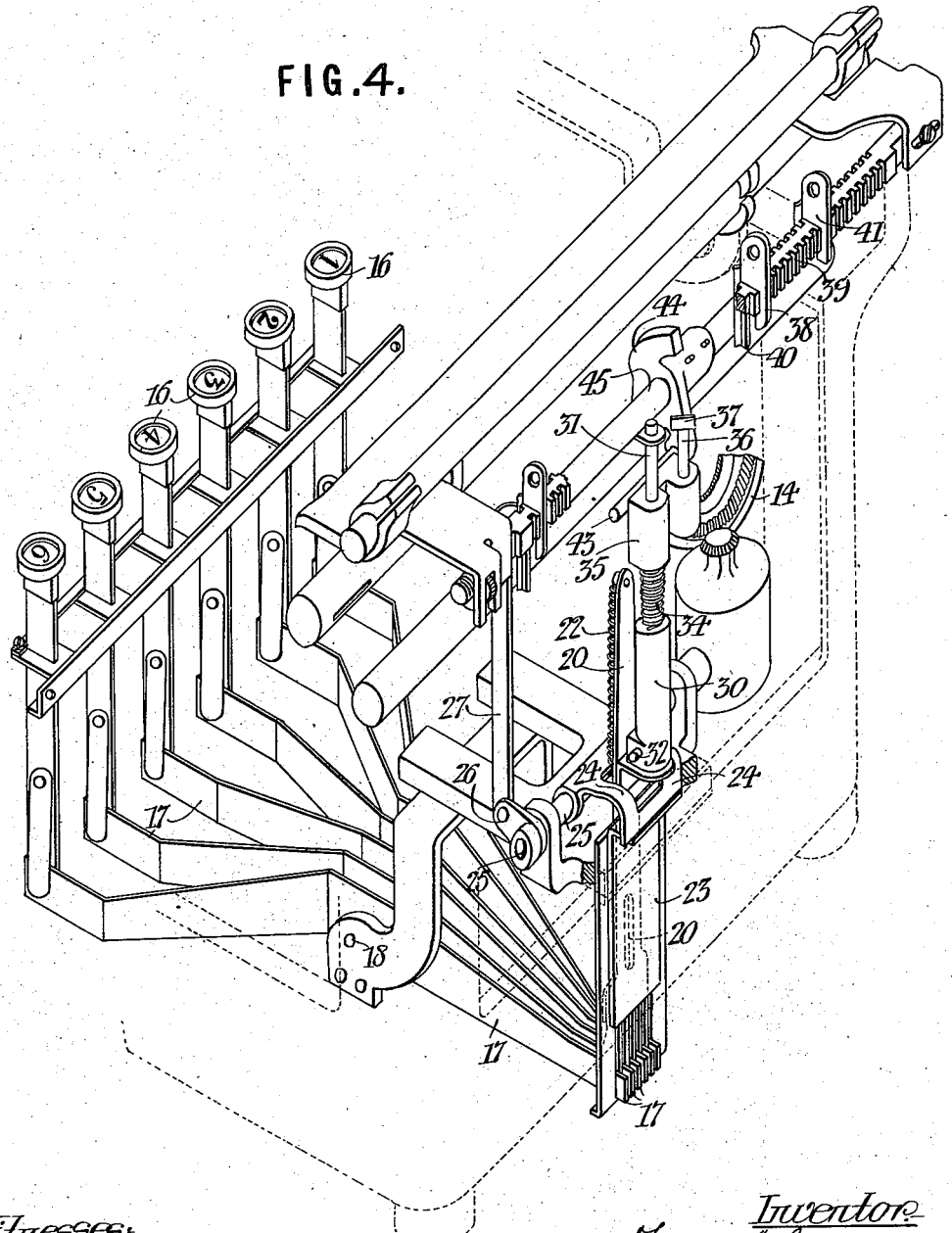

F. A. YOUNG.
TYPE WRITING MACHINE.
APPLICATION FILED MAY 17, 1912.

1,192,972.

Patented Aug. 1, 1916.
7 SHEETS—SHEET 5.

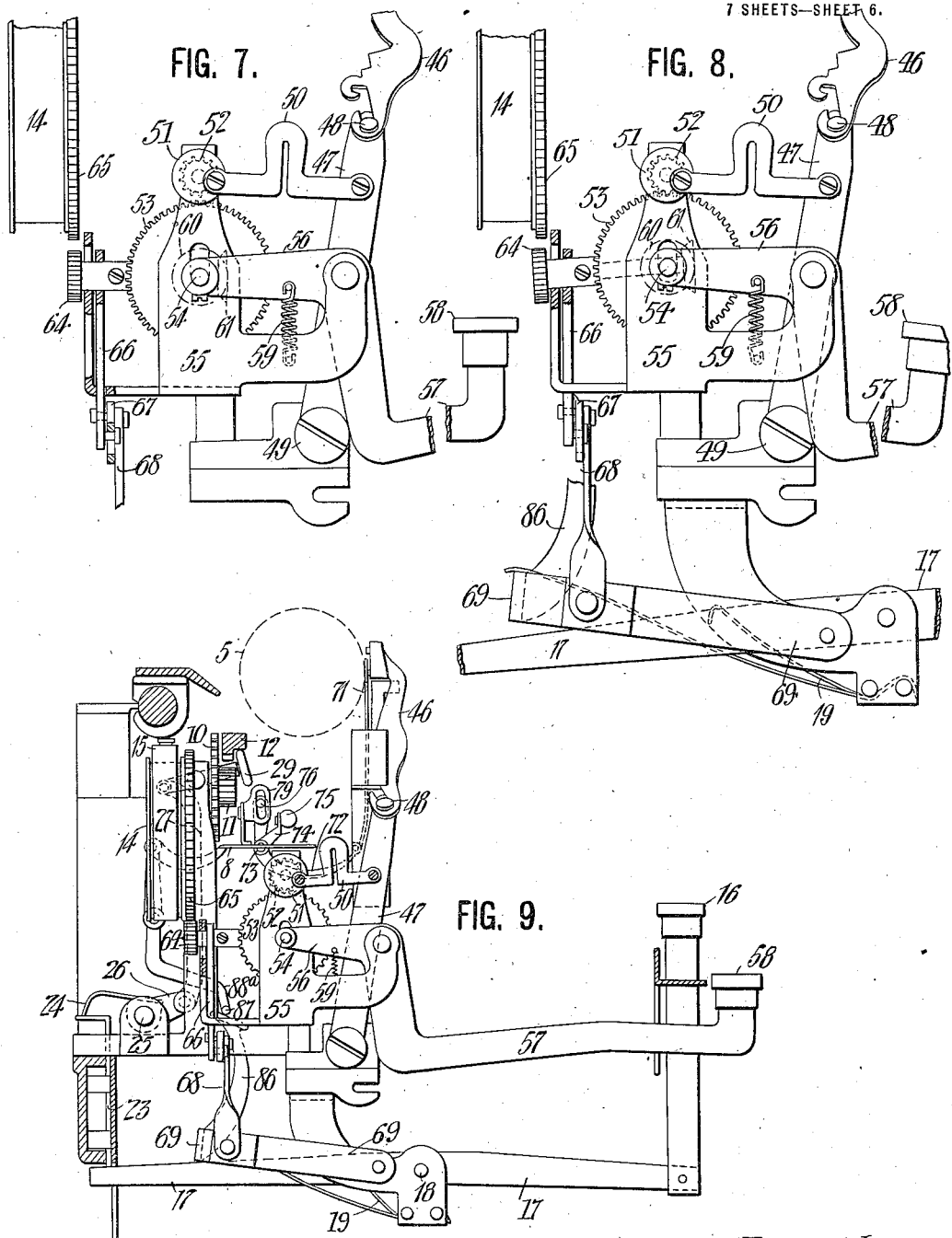

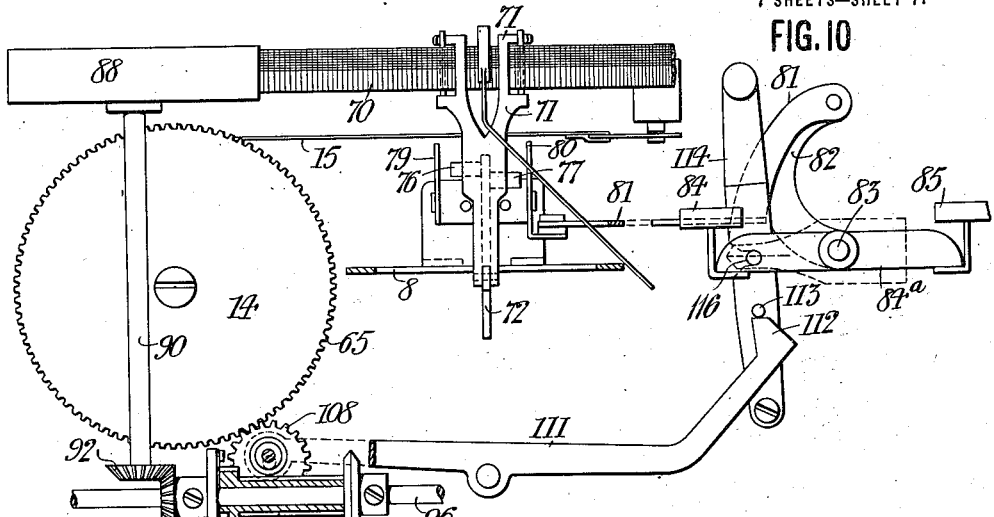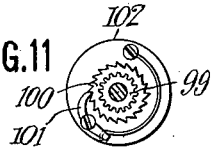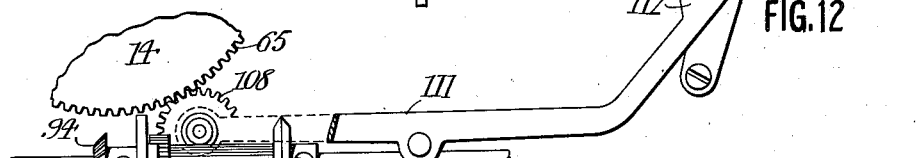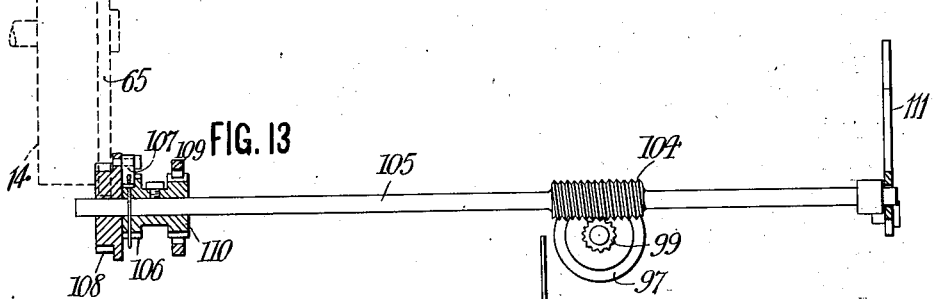

UNITED STATES PATENT OFFICE.

FRANK A. YOUNG, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,192,972.  Specification of Letters Patent.  Patented Aug. 1, 1916.

Application filed May 17, 1912. Serial No. 697,846.

*To all whom it may concern:*

Be it known that I, FRANK A. YOUNG, a citizen of the United States, residing in New York, in the county of New York and State of New York, have invented certain new and useful Improvements in Type-Writing Machines, of which the following is a specification.

This invention relates to an improvement in type-writing machines, and more especially to mechanism for effecting the mechanical printing of a series of spacing dots or dashes.

It is an object of this invention to enable the automatic or mechanical production of a series of dots or dashes during the jump movement of the typewriter carriage, as in tabulating or column spacing for the purpose of spacing printed matter at one point in the written line from printed matter at another point in the written line, or for the purpose of underscoring printed matter.

In carrying out this invention as applied to an Underwood machine, a special type bar having for one case character a dot, and for another case character a dash, is located in such a position that the dot or dash type thereon, according to whether the platen is in its lower or upper case position, is adjacent the printing point.

When the column spacing or tabulating mechanism is operated, it not only releases the carriage so that it can spring forward under the traction of its spring barrel, but it also brings a train of gearing into driven relation with a part, such as the spring barrel, acting when the carriage moves. This gearing is connected as by means of a crank and pitman arrangement to the special dot-dash type bar, so as to vibrate the latter. However, the continuity and thus the effectiveness of this train of gearing is interrupted at another point, the completion of the connection of which is under the control of a special dot-dash key. When this dot-dash key and a column spacing key are depressed at the same time, then the gearing connection is entirely completed, so that the spring barrel can drive the gearing to vibrate the dot-dash type bar.

When the character keys are not in action, the printing ribbon is depressed out of the way, so that the printed matter can be seen. Arrangement is therefore made in this case whereby the actuation of a column-spacing or tabulating key, will rock the actuator to shift up the ribbon vibrator bringing the ribbon between the dot or dash and the platen.

In order that the ribbon may not be torn by the continued striking of the dot-dash type bar, the ribbon winding mechanism is connected so as to be driven from the spring barrel. The gearing enabling this connection is interruptible, however, so that movements of the carriage caused by operating a column-spacing or tabulating key may be carried on, without the feeding of the ribbon by this means.

Other features and advantages will hereinafter appear.

Figure 2:
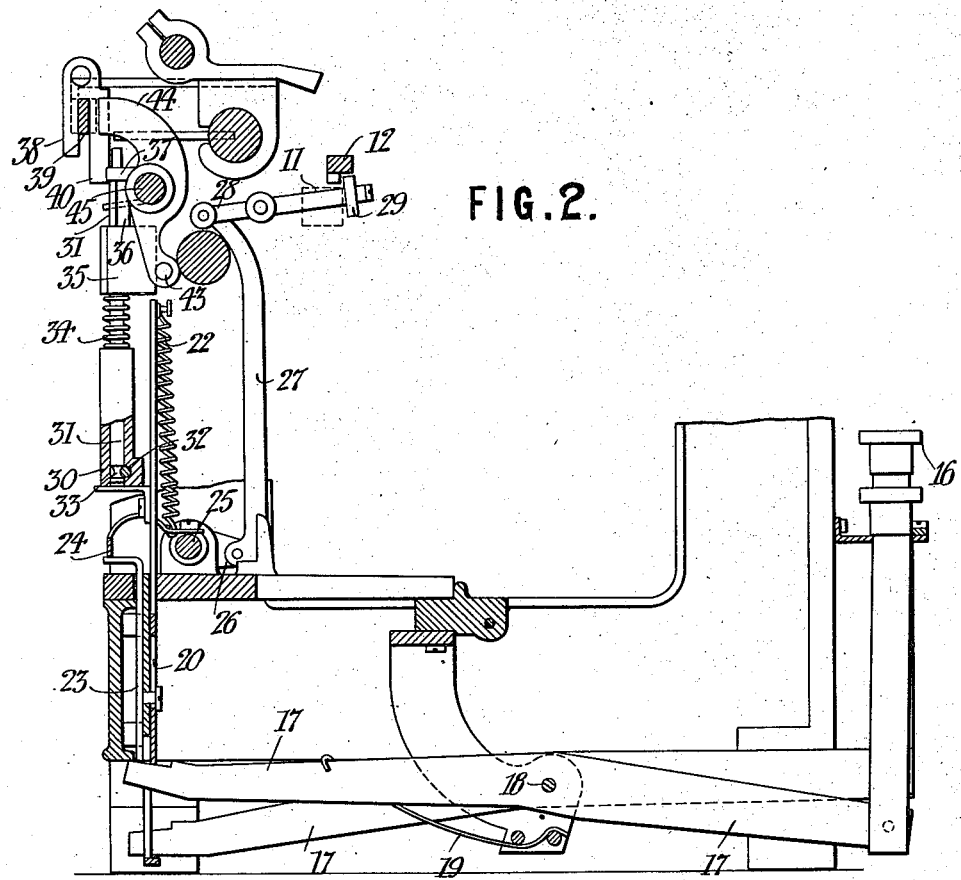
Figure 15:
Figure 5:
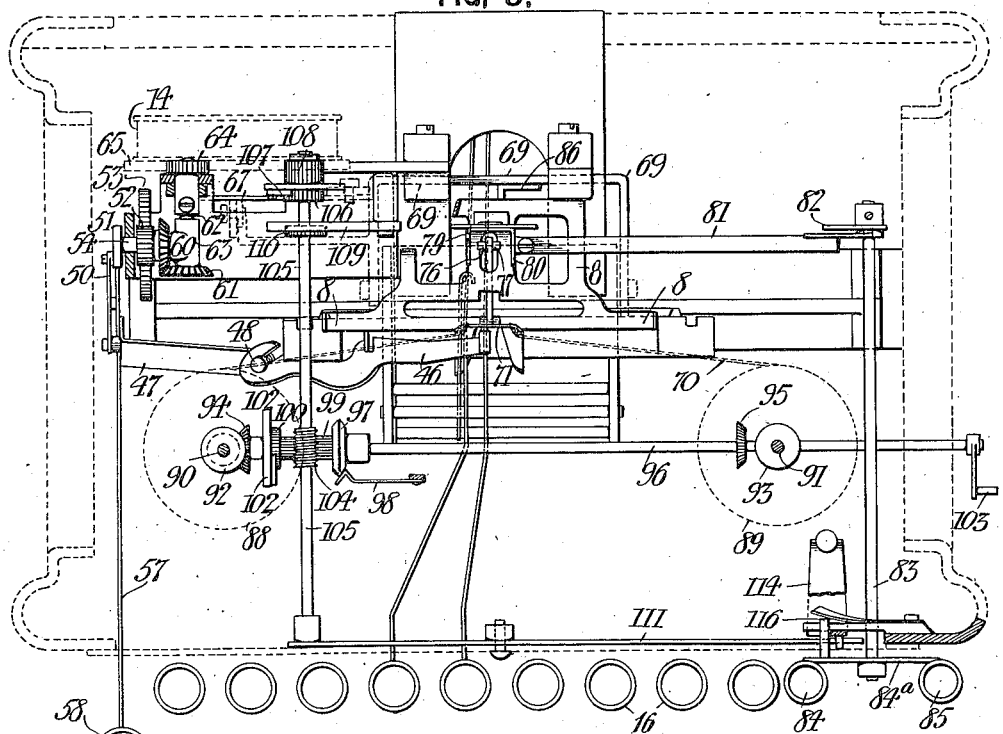
Figure 6:
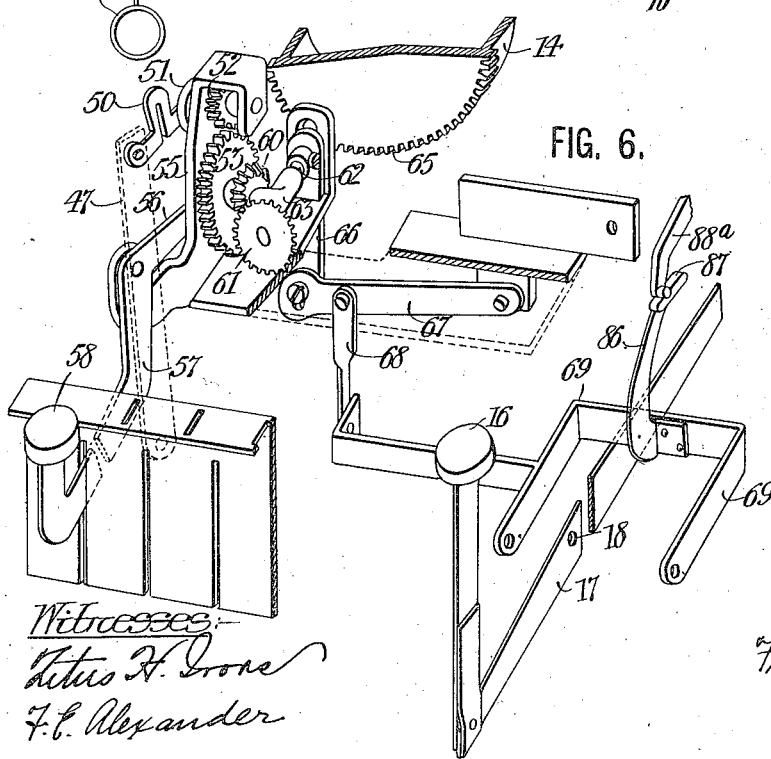

In the accompanying drawings, Figure 1 is a vertical section taken from front to rear, showing the parts in their normal inactive position. Fig. 2 is a fragmentary view similar to Fig. 1, showing one of the column-spacing keys actuated to bring the stationary stop into the path of movement of the stop carried by the carriage. Fig. 3 is a rear view in elevation, partly broken away to show the underlying structure. Fig. 4 is a perspective view. Fig. 5 is a diagrammatic top plan view. Fig. 6 is a fragmentary perspective view, showing the driving connection whereby the dot-dash type bar is vibrated, and also showing the means whereby the ribbon is shifted up to its effective position. Fig. 7 is a detail view in elevation, showing the dot-dash key in its normal ineffective position, so that the point in the gearing between the spring barrel and the dot-dash type bar, controlled by the dot-dash key is open, rendering the gearing ineffective. Fig. 8 is a view similar to Fig. 7, showing the dot-dash key, however, depressed to complete the connection of the gearing at the point controlled thereby. Fig. 9 is a detail section from front to rear, showing the relation of the various parts controlling the dot-dash type bar, and also showing the means for shifting the ribbon up to a point where it is located at a point between the dot-dash type bar and the platen. Fig. 10, is a fragmentary view, showing the relation of the ribbon feeding and shifting mechanism, with the ribbon feeding mechanism disconnected from driving relation with the spring barrel. Fig. 11 is a detail view of one of the ratchet wheels on the ribbon feeding mechanism. Fig. 12 is a fragmentary view, showing the mechanism for disconnecting the ribbon feeding or winding mechanism from driving relation with the spring barrel, but showing it in a position corresponding to the connection of the winding mechanism with the spring barrel. Fig. 13 is a detail view of the mechanism for driving the ribbon feeding mechanism from the spring barrel. Fig. 14 is a detail view of the bichrome ribbon shifting mechanism. Fig. 15 is a face view of the type bearing end of the special dot-dash type bar.

Referring more particularly to the separate parts of this invention as embodied in the form shown in the drawings, 1 indicates character keys which are mounted on key levers 2 and act when depressed to rock bell cranks 3, so as to swing type bars 4 upwardly and rearwardly against the front side of a platen 5 mounted to rotate on a carriage 6.

Each of the type bars 4 is provided with a heel 7 which, at the depression of its associated key, engages a universal frame 8 to rock a pair of pawls 9 engaging a ratchet wheel 10. This pawl and ratchet mechanism controls the rotation of a pinion 11 meshing with a rack 12 on the carriage 6, which mechanism may be termed the escapement mechanism, in that it enables the step-by-step letter-feeding movement of the carriage at each actuation of a character key.

The rack 12 is movably supported by arms 13 pivoted on the carriage 6, so that the rack can be moved up out of engagement with the pinion 11 enabling the carriage to move forwardly, under the pull of its spring barrel 14, to which it is connected by a band 15, without being controlled by the escapement mechanism. Such a movement of the carriage may be termed a major movement, and is used in tabulating or column spacing. In this instance, the control of the movement of the carriage when freed from the escapement mechanism is shown to be subservient to column-spacing mechanism. For this purpose there are provided column-space or tabulating keys 16 which are mounted on levers 17 pivoted intermediate their ends at 18 and held in a normal position with the keys 16 raised by means of individual springs 19. Each of the levers 17 is adapted to raise at its rear end a common or universal thrust plate 20, which is slidingly mounted for vertical movement. The edge of the plate 20, however, with which the key levers 17 engage, is formed with a series of steps 21, as will be seen by reference to Figs. 3 and 4, so that the levers will have variable amounts of ineffective movements before they engage the universal plate 20 to raise the same. The steps are so arranged that the first key lever of the column spacing mechanism, bearing the numeral "1" in Fig. 4, will come in contact with the plate 20 soonest, and the second key next, then the third, and so on.

The plate 20 is normally held in its depressed position by a spring 22. The key levers also raise at the end of their stroke a bar 23 which is mounted for vertical movement, so that it will raise an arm 24 engaging therewith. The arm 24 is secured to a rock shaft 25 carrying another arm 26 connected by means of a link 27 to a lever 28. The lever 28 carries on the opposite side of its pivot a bearing roller 29, which rests on one side of the rack 12, so that when the universal bar 23 is raised, the rack 12 will also be raised out of engagement with the pinion 11.

The plate 20 when it moves forces upwardly a carrier 30. Mounted on the carrier 30 so as to rotate about its vertical axis and yet so as to move therewith, there is provided a rock shaft 31. The connection between the carrier 30 and the rock shaft 31 may be formed by means of a pin 32 engaging a circumferential groove 33 in the rock shaft 31.

The rock shaft 31 is held in a normal position by means of a spring 34. Secured to the rock shaft 31, so as to swing therewith there is provided a cam block 35 which carries at a point distant from the rock shaft a stem 36 bearing an interponent 37. When the carrier 30 is raised by the actuation of one of the column spacing keys 16, it lifts the interponent 37 upwardly with a distance corresponding to the particular column spacing key struck, that is to say, if the column spacing key bearing the numeral "1" is struck, the interponent 37 will be raised its maximum distance; and if the column spacing key bearing the numeral "6" is struck, the interponent 37 will be raised its minimum distance, the intermediate keys giving graded lifts to the interponent 37 from the maximum to the minimum. The lifting of the interponent 37 brings it into the path of one of a series of stops 38 adjustably mounted on a rack 39 carried by the carriage 6. Each of these stops 38 is provided with a tappet 40 depending therefrom. The magnitude of these tappets, however, is different in the case of each stop, and they ascend in magnitude from left to right of the carriage, that is to say, the stop indicated at 41 in Figs. 3 and 4, has a tappet of least magnitude, and the stop indicated at 42 has a tappet of maximum magnitude, the intermediate stops having tappets increasing in length from the stop 41 to the stop 42.

The interponent 37 does not, in itself, stop the carriage 6 when it is engaged by one of the tappets, but is shifted by the tappet so as to rock the shaft 31, whereby the cam block 35 is swung into engagement with a pin 43. This pin is secured to a relatively fixed stop 44 secured to a rock shaft 45 mounted on the frame of the typewriting machine. The upper end of the stop 44, when actuated by the cam block 35, will swing into the path of movement of the stop which actuated the interponent 37, thus bringing the carriage to rest. It will thus be seen by this arrangement that the carriage can be made to run forwardly variable amounts to select any column on the worksheet on the carriage, which will arrive at the printing point of the typewriter when the carriage stops.

It is sometimes desired to space the printed matter at one point in the typewritten line from printed matter at another point in the typewritten line by means of dots or dashes. It is also often desired to underscore typewritten matter already written. To do this by the repeated striking of a single key is tedious and consumes a large amount of time. In this invention advantage is taken of the movement of the typewriter caused by the operation of a tabulator key to effect a production of either a dot or dash line. To accomplish this purpose there is provided a special type bar 46 pivoted intermediate its ends and having a dot type and a dash type thereon corresponding to lower and upper case characters; one acting when the platen is in its lower position, and the other acting when the platen is in its upper position. The dot type may have a plurality of dots, say two, thus requiring less vibrations of the bar and giving a neater and more compact appearing line. The dash may be arranged to form a line corresponding to the position of a hyphen or to an underscore line; in either case the other position of line can be easily produced by moving the platen or worksheet up or down slightly.

The dot-dash type bar 46 is operated by a vibrating lever 47 which is connected thereto at one end by a pin and slot connection 48, and which is pivotally mounted at its other end in any suitable manner, as at 49. The oscillating movement of the lever 47 is obtained through the intermediary of a link or pitman 50 from a crank disk 51 secured to rotate with a pinion 52. The pinion 52 will be rotated by a gear 53 when the latter is in engagement therewith. Normally, however, the gear 53 is in its lower or depressed position out of mesh with the pinion 52, as shown in Fig. 7.

The shaft of the gear 53, which is indicated at 54, is mounted for vertical movement in a bracket 55, and is journaled in one arm 56 of a key lever 57 bearing at its front end a key 58. This key may be termed the dot-dash key, in that it controls the effectiveness of the dot and dash mechanism, that is to say, when the key 58 is depressed against the tension of a spring 59, the gear 53 will be brought up in mesh with the pinion 52 to complete the gearing connection at this point, so as to enable the vibration of the dot-dash type bar 46 when the carriage runs forwardly in column spacing.

The motor means for driving the gear 53 may be of any suitable character, but preferably some part of which moves when the carriage 6 runs forwardly. In this instance the spring barrel 14 is utilized as the source of motor power. To accomplish this there is provided a beveled gear 60, which is connected to rotate with the gear 53 and meshes with a beveled gear 61 secured on a shaft 62. The shaft 62 and the shaft 54 have bearings in a floating frame 63, so that this nest of gearing is movable bodily.

On the opposite end of the shaft 62 from the beveled gear 61 there is provided a gear 64 which can be brought into mesh with a gear 65 secured to rotate with the spring barrel 14. The gear or pinion 64, however, is normally in a depressed position out of mesh with the gear 65, as indicated in Figs. 7 and 8. To bring this pinion 64 in mesh with the gear 65, there is secured to the shaft 62 a thrust link 66, which has a pin and slot lost motion connection with a lever 67. The lever 67 is operated through the intermediary of a link 68 from a bail 69 which overlies all of the column spacing key levers 17 at the rear side of their pivots 18.

It will thus be seen that before the dot-dash type bar 46 can receive a vibratory movement, it is necessary to depress both the dot-dash key 58 and one of the column spacing keys 17. These keys when both depressed complete the train of gearing between the spring barrel 14 and the crank disk 51, which vibrates the lever 47 and thus the type bar 46.

In the Underwood machine to which this invention is shown as applied, a printing ribbon 70 is threaded through a vibrator 71 which receives its motion from an actuator 72 pivoted at 73 on a bracket 74, which moves with the shift rail 75 for the platen frame. The actuator 72 is provided, on opposite sides thereof on the same side of the pivot, with a pair of wrists 76 and 77, the latter of which is located nearer the pivot than the former.

When any one of the character keys 1 is actuated, the universal frame 8 is moved rearwardly so that a pair of ears 79 and 80 carried thereby, will also move rearwardly. These ears each have a slot therein into which the wrist pins 76 and 77 may engage one at a time. For this purpose the ears are secured together and are slidingly mounted on the universal frame 8 by means of a pin and slot connection, so that they can be slid sidewise to bring either one of the wrists in the corresponding slot or to occupy an intermediate position, such as that shown in Fig. 10.

10, in which neither of the wrists are in the slots.

It will be seen, in as much as the universal frame 8 has a fixed movement, that the wrists give different extents of movement to the actuator, and thus to the ribbon vibrator. The effect of this is to bring the black portion of the bichrome ribbon in front of the type, on the type bar actuated, when one of the wrists is in play and to bring the red portion when the other wrist is in play.

To obtain a shifting of the ears, the frame which connects them is connected by a link 81 to an arm 82 on a rock shaft 83. This rock shaft bears at its forward end a lever 84ª having keys 84 and 85, one of which is red and the other black, to designate which portion of the ribbon will be in play when the particular key is depressed.

In the Underwood machine to which this invention is shown as applied, the ribbon occupies a normally depressed position when none of the character keys 1 are actuated, thus leaving the printed line on the worksheet clear, so that it can be easily seen. It is therefore evident that in order to use the dot-dash attachment, the ribbon must be shifted up to its effective position before the dot-dash type bar 46 starts to vibrate. To accomplish this purpose the bail 69 is provided with an upwardly extending lug or arm 86 which, when raised by the actuation of one of the column spacing keys, will engage a pin 87 to rock a lever 88ª on which the pin is located. The opposite end of this lever is connected by an arm to the universal shift frame, so that the latter will be moved thereby rocking the actuator 72 to lift the ribbon vibrator and bring the ribbon between the platen and the type on the dot-dash type bar 46.

In order to prevent the rapidly vibrating dot-dash type bar 46 from punching a hole in the ribbon, it is necessary to feed the ribbon during the dot line-making action. The opposite ends of the ribbon 70 are mounted on spools 88 and 89 which are secured to shafts 90 and 91. The bottom of these shafts bear beveled gears 92 and 93 which can be made to mesh respectively with beveled gears 94 and 95, secured to a shaft 96. This shaft is slidingly mounted so that it can be moved longitudinally to alternately bring the gears 94 and 95 into mesh with their associated gears.

To hold the shaft in either adjusted position, there is secured thereon a beveled collar 97 which is adapted to engage a spring latch 98 in either position of adjustment. The shaft 96 has loosely mounted thereon a barrel gear 99, which is provided with a ratchet wheel 100. The ratchet wheel is normally engaged by a spring-pressed pawl 101 secured to a disk 102, which in turn is secured to the shaft 96. This arrangement permits the shaft 96 to be rotated by a crank 103 without disturbing the barrel gear 99.

The barrel gear 99 is driven from a worm 104, secured to a shaft 105. The shaft 105 has secured thereon a ratchet wheel 106 engaged by a spring-pressed pawl 107, secured to a gear 108 loosely mounted on the shaft 105. The gear 108 meshes with the gear 65 on the spring barrel 14, so that the ribbon winding mechanism can be driven from the spring barrel during the operation of the dot-dash attachment. The pawl and ratchet connection of the gear 108 is to enable the return movement of the carriage and the spring barrel 14 without rotating the shaft 105. Backward rotation of the shaft 105 may be prevented by a gravity pawl 109, which engages a ratchet wheel 110 secured to the shaft 105.

Inasmuch as it is often desirable to have a movement of the carriage and incidentally of the spring barrel without a corresponding feeding of the ribbon, the driving connection between the spring barrel 14 and the winding mechanism for the ribbon is interruptible so as to permit the ribbon winding mechanism to remain idle. For this purpose the shaft 105 is loosely mounted at one end and is journaled in a pivotally mounted lever 111 at its other end. This lever is arranged, so that it may be rocked to lift the shaft 105 and thus move the worm out of mesh with the spring barrel 99.

To rock the lever 111 its opposite end is provided with a cam enlargement 112, which can be engaged, by a pin 113 on a lever 114 when the latter is rocked, to depress this end of the lever 111. The cam is made at the top with a resting portion so that the pin 113 can stop on this point, holding the worm out of mesh with the spring barrel.

The actuation of the lever 114 can also be used to prevent the vibratory movement of the ribbon. For this purpose lever 114 may be provided with a groove 115, having guiding cam edges which are adapted to engage a pin 116 on the bichrome key lever 84ª, so as to move the latter to an intermediate position corresponding to a position of the shifting ear frame in which both of the wrist pins on the actuator are out of engagement with the ears.

In the use of the device for printing a dotted line, the platen is left in its normal lower case position. To print a dash line, the platen is raised by the usual shift key mechanism to its upper case position. Whether a dot or dash line is to be printed, the dot-dash key 58 is depressed so as to bring the gear 53 into mesh with the pinion 52. One of the column spacing keys 16 is then depressed according to the distance which it is desired to move the carriage, or in other words, according to what particular point or column it is desired to stop at the printing point of the typewriter.

The actuation of the column space key raised the bail 69, which lifted the arm or lug 86, so as to rock the lever 88ª, and thus actuate the universal shift frame, whereby the actuator 72 will be rocked to lift the vibrator and thus lift the ribbon to a position between the type on the dot-dash bar 46 and the platen. The bail 69 when actuated also raised the shaft 62, so as to bring the gear 64 in mesh with the gear 65, thus completing the drive between the spring barrel and the mechanism for vibrating the dot-dash type bar.

The column spacing key depressed will raise the universal plate 20 an amount corresponding to the key; if it is the key marked "1," it will raise the same the maximum amount, the key "2" the next greatest amount, and so on in a gradually decreasing scale. The bar 23 is also raised to cause the roller 29 through the intermediate mechanism, to lift the rack 12 out of mesh with the pinion 11, so that the carriage is free to spring forward under the traction of its spring barrel. The spring barrel in rotating will rotate the gear 64 to cause a vibratory movement of the dot-dash type bar 46, and will also rotate the gear 108 to start a winding action of the ribbon mechanism causing the ribbon to feed through its vibrator during the movement of the carriage.

It will thus be seen that a combined run of the carriage, such as column spacing movement of the carriage and a printing of a dot or dash line, can be effected concomitantly. If it should be desired to column space without making a dot or dash line, it is merely necessary to leave the dot-dash key 58 in its raised position. If it should be desired to have a movement of the carriage without winding the ribbon, the lever 114 can be rocked to cause the lever 111 to raise the shaft 105, thereby lifting the worm 104 out of mesh with the spring barrel 99. This action also silences the ribbon vibrator as above explained.

Variations may be resorted to within the scope of the invention, and portions of the improvements may be used without others.

Having thus described my invention, I claim:

1. The combination with a carriage, and means to drive the carriage, of a series of character keys, means for feeding a printing ribbon along at the actuation of said keys, and for concomitantly feeding said ribbon and said carriage while said keys are inactive, a type bar having a normal position of rest away from the printing point, and mechanism to automatically vibrate the type bar between said position of rest and the printing point by power from said carriage driving means, and thereby cause a row of characters to be printed during said feeding of the ribbon and carriage.

2. The combination with a carriage, of motive means for driving said carriage, mechanism for feeding a printing ribbon, driving connections between said feeding mechanism and said motive means, a type, and gearing between the motive means and the type for vibrating the type.

3. The combination with a carriage and a motor to drive the carriage, of a tabulating mechanism for controlling forward movements of said carriage, means actuated by said tabulating mechanism to shift a printing ribbon, a type bar, and a gear train between the motor and the type bar to vibrate the type bar by power from the motor during the said movements of the carriage.

4. The combination with a carriage, of a tabulating mechanism for controlling the tabulating movements of the carriage, a type bar, a reciprocating driver for vibrating the type bar, a motor to drive the carriage, power-transmitting mechanism between the motor and said reciprocating driver to operate the latter and vibrate the type bar for effecting a continuous printing during the travel of the carriage, and means actuated by the tabulating mechanism to interpose a printing ribbon into the path of movement of the type on said type bar.

5. The combination with a carriage, of a tabulating mechanism for controlling forward movements of said carriage, a vibratory type-bar for effecting a continuous printing during the movement of said carriage, means actuated by said tabulating mechanism for interposing a printing ribbon into the path of movement of the type on said type-bar, and means for preventing the shifting of said ribbon at the actuation of said tabulating mechanism, so that said mechanism can be used without actuating said ribbon.

6. The combination with a carriage and motive means to drive the carriage, of a tabulating mechanism for controlling forward movements of said carriage, a vibratory type-bar, gearing between the motor and type-bar to vibrate the type-bar by power from the motor and thereby perform a continuous printing during such a movement of said carriage, means actuated by said tabulating mechanism for interposing a printing ribbon into the path of the type on said type-bar, ribbon winding mechanism, and means controlled by said tabulating mechanism for inciting said ribbon winding mechanism to action during the movement of said carriage.

7. The combination, with a carriage; of tabulating mechanism for controlling forward movements of said carriage; a type; means for automatically reciprocating the type during a tabulating movement of the carriage, so as to effect a continuous printing during such movement; means for interposing a printing ribbon in the path of said type; and means for feeding said ribbon during the said tabulating movement of said carriage.

8. The combination, with a carriage, and a motor to drive it; of a tabulating mechanism for controlling forward movements of said carriage; a special type; a gear train between said motor and said type operable to automatically reciprocate the latter, said type having a printing ribbon coöperative therewith; means for winding said ribbon; and means for inciting said winding means to action at the operation of said tabulating mechanism.

9. The combination with a carriage, of a special printing means for effecting a continuous printing during a forward movement of said carriage, a tabulating mechanism for controlling forward movements of said carriage, means controlled by said tabulating mechanism for shifting a printing ribbon into the path of said printing means, means for feeding said ribbon during the action of said printing means, and mechanism for concomitantly rendering said feeding means and said ribbon shifting means ineffective so that said tabulating mechanism can act to cause an independent movement of said carriage.

10. The combination with a carriage, of a tabulating mechanism for controlling forward movements of said carriage, a special type-bar, means for vibrating said special type-bar during such a movement of said carriage including a train of gears interruptable at a certain point, means for enabling said tabulating mechanism to control the continuity of said train of gears at said certain point, and means controlled by said tabulating mechanism for shifting a printing ribbon to an effective position in the path of said type-bar.

11. The combination with a carriage, of a series of key levers for controlling the extent of movement of said carriage, a special type-bar for effecting a printing during the movement of said carriage, means for operating said type-bar, and means operated by said key levers for concomitantly shifting a printing ribbon to an effective position and enabling said first-mentioned means to actuate said type-bar.

12. The combination with a carriage, of a series of key levers for controlling forward movements of said carriage, a special type-bar for effecting a continuous printing during the movement of said carriage, means for actuating said type-bar, a bail operated by all of said key levers, connections operated by said bail to enable the actuation of said type-bar by said means, and connections operated by said bail to bring a printing ribbon into effective coöperation with said type-bar.

13. The combination with a carriage and a set of tabulator keys, of means controlled by said keys to enable the carriage to run forwardly different extents selectively determined by said keys, a vibratable type bar, and means for automatically vibrating the type bar to effect a continuous printing during a forward run of the carriage under the control of a tabulator key, and means to feed a ribbon over the printing point during said printing.

14. In a typewriting machine, the combination with a carriage and a motor to drive the carriage, of a type for writing a dotted line on the paper on the carriage, said type bar having a normal position of rest away from the printing point, a normally ineffective gear train between the motor and type bar, key-controlled means to render said train effective and cause the type bar to be vibrated between its said position of rest and the printing point by power transmitted from the motor through said train, and dot a complete line, and means to feed a ribbon over the printing point during the writing of said line.

15. In a typewriting machine, in combination, a paper carriage, a motor, a type bar adapted to write a dot or dash, said type bar having a normal position of rest away from the printing point, a gear train between the motor and type bar operable to positively reciprocate the type bar between its said position of rest and the printing point while the carriage advances, and ribbon mechanism operated during the operation of said type bar, to feed the ribbon over the printing point.

16. In a typewriting machine, the combination with a carriage and an escapement controlling the letter-feed travel of the carriage, of means tending to advance the carriage, means for releasing the carriage from the escapement and permitting the advance of the carriage through more than one type space, a type having a normal position of rest away from the printing point, mechanism for positively vibrating the type between said position of rest and the printing point by power supplied from said carriage-advancing means, during the advance of the carriage, and ribbon feed mechanism automatically actuated during the advance of the carriage.

17. In a typewriting machine, in combination, a paper carriage, a gear wheel arranged to rotate when said carriage advances, mechanism for writing dots, means for actuating said mechanism from said gear wheel, comprising a clutch, means for throwing said clutch into and out of connection, and ribbon feed mechanism operated concomitantly with the dotting mechanism.

18. In a typewriting machine, in combination, a paper carriage, a motor to drive the carriage, a type bar, a gear train and clutch between the motor and the type bar, a tabulator key controlling the carriage and said clutch, said key operable to effect a forward run of the carriage and to operate the clutch and establish a driving connection from the motor through said gear train to the type bar and cause the type bar to be positively operated to write a line as the carriage advances, and mechanism for feeding a ribbon over the printing point concomitantly with the operation of said type bar.

19. In a typewriting machine, in combination, a carriage, mechanism for writing dots, a gear train for driving said mechanism, a key for throwing said gear train into active relation to said mechanism, a tabulator key for closing said gear train to drive said writing mechanism, and means to feed a ribbon during the operation of the writing mechanism.

20. In a typewriting machine, in combination, a paper carriage, mechanism for writing dots, means to concomitantly feed a ribbon, automatic means for actuating said mechanism, and a pair of controlling keys, both of which must be depressed to effect a driving connection through said mechanism.

21. In a typewriting machine, in combination, a paper carriage, mechanism for writing dots, a driving member arranged to move when the carriage moves, a driving train between said driving member and said mechanism, a dotter key for closing said driving train at one point, a tabulator key for closing said driving train at another point, and means to feed a ribbon over the printing point during the operation of said writing mechanism.

22. In a typewriting machine, in combination, a type-bar for writing dots, a gear train including two clutches for driving said type-bar, keys for opening and closing said clutches respectively, and mechanism to feed a ribbon while said type bar is being driven by said gear train.

23. In a typewriting machine, in combination, a carriage, a motor, a type-bar, mechanism automatically operated by power from said motor to positively drive said type-bar in its forward striking movement when said carriage advances, a key for controlling the operation of said mechanism, and ribbon feed mechanism for advancing a ribbon over the printing point during the operation of said type-bar.

24. In a typewriting machine, in combination, a type-bar for writing dots, a crank disk, a connecting rod attached to said crank disk and connected with said type-bar to actuate the same when said crank disk rotates, a carriage, means for continuously rotating said crank disk when said carriage advances, and means to automatically feed a ribbon during the rotation of the crank disk.

25. In a typewriting machine, in combination, a type-bar for writing dots, a segment supporting the same, a lever for actuating said type-bar, a carriage, means for positively reciprocating said lever, actuated when said carriage advances, and means to feed a ribbon concomitantly with the reciprocation of said lever.

26. In a typewriting machine, in combination, a type-bar for writing dots, a segment supporting the same, a lever for actuating said type-bar, a carriage, means for positively reciprocating said lever actuated when said carriage advances, ribbon feed mechanism operated during the reciprocation of said lever, a tabulator key controlling said carriage, a clutch controlled thereby and through which said lever is driven, a second clutch through which said lever is driven, and a key controlling said second clutch.

27. In a typewriting machine, the combination with a type and a carriage, of means for driving said carriage, an interrupted train for causing said carriage to vibrate said type, a tabulator key, a second key arranged when depressed simultaneously with said tabulator key to complete said interrupted train, means for locking said second key depressed, and ribbon feed mechanism operable during the vibration of said type.

28. In a typewriting machine, the combination with a vibrating type-bar and a carriage, of a gear rotated by said carriage, means to feed a ribbon during the carriage travel, a pitman positively driving said type-bar back and forth, a second gear driving said pitman, and a key controlling a clutch intermediate said gears.

29. In a typewriting machine, the combination with a type and a carriage, of power means for vibrating said type, means to feed a ribbon during the vibration of said type, a tabulator key for connecting said power to said type, and means settable for causing said tabulator key to be operative or inoperative to make said connection.

30. The combination with a shiftable platen, of a line making type-bar having a plurality of different types to produce different characters of lines, means to produce a continuous vibrating movement of said bar during a longitudinal forward movement of said platen, and means to feed a ribbon over the printing point during the vibration of said bar.

31. The combination with a carriage, of motive means for driving said carriage, a type bar, gearing between the motive means and type bar for vibrating the type bar, mechanism for feeding a printing ribbon during the vibration of said type bar, and driving connections between said feeding mechanism and said motive means.

32. In a typewriting machine, the combination with a type and a carriage, of a motor for driving said carriage, an interrupted train for causing said motor to vibrate said type, a tabulator key, a second key arranged when depressed simultaneously with said tabulator key to complete said interrupted train, and ribbon feeding mechanism geared to the motor for operation during the vibration of said type.

33. In a typewriting machine, the combination with a type and a carriage, of ribbon feed mechanism, power means for concomitantly vibrating said type and operating said mechanism, a set of tabulator keys, and means controlled by each of said keys for connecting said power to said type.

34. In a typewriting machine, the combination with a type and a carriage, of ribbon feed mechanism, power means for concomitantly vibrating said type and operating said mechanism, a set of tabulator keys selectively operable to effect a forward run of the carriage through a variable distance determined by the selected key, and an auxiliary key arranged to permit said tabulator keys to control the connection of said power to said type and cause the latter to print during the forward run of the carriage when a tabulator key and said auxiliary key are concomitantly operated.

35. In a typewriting machine, the combination, with a platen and its carriage; of a type-bar; a reciprocating driver for the type-bar; power-driven mechanism, independent of the carriage, for automatically reciprocating said driver to vibrate said type-bar and print a row of characters; and means for automatically moving a ribbon, which is normally in position to uncover the printing point, over the said printing point and retaining it in such position during said printing.

36. In a typewriting machine, the combination, with a platen and its carriage; of a type-bar; means to traverse said carriage and platen; mechanism for automatically vibrating said type-bar, to print a row of characters; a key; means operated by said key to effect a driving connection, independent of said carriage, between said traversing means and said vibrating mechanism, to actuate the latter from the former; and means controlled by said key to shift a ribbon to position to cover the printing point during the vibration of said type-bar.

37. In a typewriting machine, the combination, with a paper carriage, and driving means therefor; of tabulating mechanism controlling a forward run of said carriage; a type-bar; means controlled by the tabulating mechanism for establishing a driving connection, independent of said carriage, between said driving means and said type-bar, to automatically vibrate the latter during such carriage run; and means to automatically shift a ribbon to position to cover the printing point, and to maintain it in such position during said run.

38. In a front-strike typewriting machine, the combination with a paper carriage, and means to drive the carriage, of a tabulating mechanism comprising a key operable to effect a forward run of the carriage, means operated by said key to lift a ribbon normally below the printing point and hold it over the printing point during said run of the carriage, a type-bar, a normally open gear train between the type bar and the carriage-driving means, and means controlled by said key to close the gear train to automatically vibrate the type-bar during said run of the carriage by power transmitted from the carriage-driving means through the gear train.

39. In a typewriting machine, the combination with a paper carriage, and driving means therefor, of a ribbon vibrator and guide, tabulator mechanism comprising a series of keys selectively operable to cause the carriage to run forwardly to different positions, a type-bar, means controlled by each of said keys to effect a driving connection between the carriage-driving means and type bar to automatically vibrate said type-bar during the forward run of the carriage, and means controlled by the tabulator mechanism to shift the ribbon and hold it over the printing point during the vibration of said type-bar.

FRANK A. YOUNG.

Witnesses:
EDWARD THOMAS,
TITUS H. IRONS.